United States Patent [19]

Porton et al.

[11] Patent Number: 5,168,796
[45] Date of Patent: Dec. 8, 1992

[54] COMBINATION TABLE AND COOKING GRILL

[76] Inventors: Jay P. Porton, 528 Suannee Dr., Tampa, Fla. 33606; Frederick O. Dowdy, 9004 Esthel Rd., Tampa, Fla. 33637

[21] Appl. No.: 845,624

[22] Filed: Mar. 5, 1992

[51] Int. Cl.⁵ .................. A47J 37/00; A47J 37/07
[52] U.S. Cl. ...................... 99/340; 99/357; 99/482; 108/50; 126/25 R; 126/41 R
[58] Field of Search ............. 99/339, 340, 357, 419, 99/450, 447, 482; 126/299 R, 41 R, 25 R, 277; 108/50

[56] References Cited

U.S. PATENT DOCUMENTS

| | | | |
|---|---|---|---|
| D. 131,939 | 4/1972 | Robinson | 99/421 H |
| 2,094,915 | 10/1937 | Dawson | 126/25 R |
| 2,674,991 | 4/1954 | Schaefer | 126/299 R |
| 3,491,744 | 1/1970 | Von Kohorn et al. | 126/25 R |
| 3,745,303 | 7/1973 | Epperson et al. | 99/450 |
| 4,481,408 | 11/1984 | Scheufler | 99/450 |
| 4,616,626 | 10/1986 | Kawn Soon | 126/299 R |
| 4,635,613 | 1/1987 | Tucker et al. | 126/25 R |
| 4,635,614 | 1/1987 | Segroves | 126/41 R |
| 4,813,397 | 3/1989 | Yamada | 126/299 R |
| 4,840,128 | 6/1989 | McFarlane et al. | 126/41 R |

FOREIGN PATENT DOCUMENTS

| | | | |
|---|---|---|---|
| 0153137 | 9/1982 | Japan | 126/299 R |
| 0187537 | 11/1982 | Japan | 126/299 R |

*Primary Examiner*—Timothy F. Simone
*Attorney, Agent, or Firm*—A. W. Fisher, III

[57] ABSTRACT

A combination table and cooking grill comprising a substantially horizontal table top having a centrally disposed aperture formed therethrough with a table support surface formed about the periphery thereof mounted on the upper portion of a substantially vertical hollow pedestal, an inner grill housing to operatively house a heat source therein and a cooking grate disposed in operative alignment with the heat source and the centrally disposed aperture such that persons around the periphery of the substantially horizontal table top can cook on the cooking grate as well as place food, drinks, condiments and the like on the table support surface.

54 Claims, 3 Drawing Sheets

COMBINATION TABLE AND COOKING GRILL

BACKGROUND OF THE INVENTION

1. Field of the Invention

A combination table and cooking grill.

2. Description of the Prior Art

Various devices have been developed to provide combination cookers and eating surfaces. Examples of such devices include indoor as well as outdoor cookers.

U.S. Pat. No. 4,616,626 describes a cooking device comprising a table surface provided with a gas burner container including a plurality of surrounding ventilation holes disposed above a burner located within the burner container.

U.S. Pat. No. 4,582,046 teaches a roaster having radially spaced outer and inner casings with a smoke outlet passage defined therebetween. The inner casing has an annular step extending along the inner peripheral surface thereof.

U.S. Pat. No. 4,840,128 shows a table comprising a table top having a centrally disposed aperture to receive a charcoal grill barbeque therein.

U.S. Pat. No. 4,635,614 describes a picnic table including a pot cooker comprising a box with a side opening that extends below the table top for passage of air therethrough and an extension of a propane gas line therethrough. A cylindrical gas burner element holder is also provided with a side opening for passage of air and the propane gas line therethrough that extends to a gas burner supported on a plate of a gas burner support. A serpentine cooking grill rests on the top rim of the cylindrical holder to support a cooking utensil with the utensil bottom well down in the cooker box.

U.S. Pat. No. 4,335,705 teaches a smoke collecting and exhausting system for a roaster broiler. The roaster broiler includes a smoke exhaust passage to direct smoke from the roaster downwardly to a smoke collecting and exhausting system. The smoke collecting and exhausting system includes a smoke collecting duct which communicates with the smoke exhaust passage for collecting smoke from the roaster. A smoke drawing device is provided at a location away from the roaster and is connected to the smoke collecting duct downstream of the roaster.

U.S. Pat. No. 2,094,915 describes a cooking device including an upright fire pot having side walls, a horizontally disposed shelf around the fire pot, fingers secured to the side walls of the fire pot and cooperating with the shelf to hold the fire pot spaced from the shelf and legs for supporting the fire pot and shelf in elevated position.

Additional examples of the prior art are shown in U.S. Des. No. 253,931 and U.S. Des. No. 286,002.

SUMMARY OF THE INVENTION

The present invention relates to a combination table and cooking grill comprising a substantially horizontal table top having a centrally disposed aperture formed therethrough with a table support surface formed about the periphery thereof mounted on the upper portion of a substantially vertical hollow pedestal. An inner grill housing to operatively house a heat source therein is disposed within the substantially vertical hollow pedestal. A cooking grate supported above the inner grill housing is disposed in operative alignment with the heat source and centrally disposed aperture such that persons around the periphery of the substantially horizontal table top can cook on the cooking grate as well as place food on the table support surface.

The inner grill housing comprises a lower burner chamber to house the heat source such as a gas grill burner, an intermediate expansion chamber and an upper cooking chamber to house lava rock or the like in spaced relationship relative to the cooking grate. An insulation, draft sleeve is disposed in surrounding spaced relationship relative to the inner grill housing to cooperatively form an insulation, draft channel therebetween.

In use, the heat source is activated to the desired cooking temperature. Then the food to be cooked or heated is placed on the cooking grate. Once the food is cooked or heated as desired, the food may be conveniently placed on the table support surface.

During operation, ambient air is drawn down through the insulation, draft channel while, the heated air above the heat source draws air through the intermediate expansion chamber to be directed or distributed upwardly through the lava rock to the cooking grate or grill.

The invention accordingly comprises the features of construction, combination of elements, and arrangement of parts which will be exemplified in the construction hereinafter set forth, and the scope of the invention will be indicated in the claims.

BRIEF DESCRIPTION OF THE DRAWINGS

For a fuller understanding of the nature and object of the invention, reference should be had to the following detailed description taken in connection with the accompanying drawings in which.

Similar reference characters refer to similar parts throughout the several views of the drawings.

DETAILED DESCRIPTION OF THE PREFERRED EMBODIMENT

Figure 1:
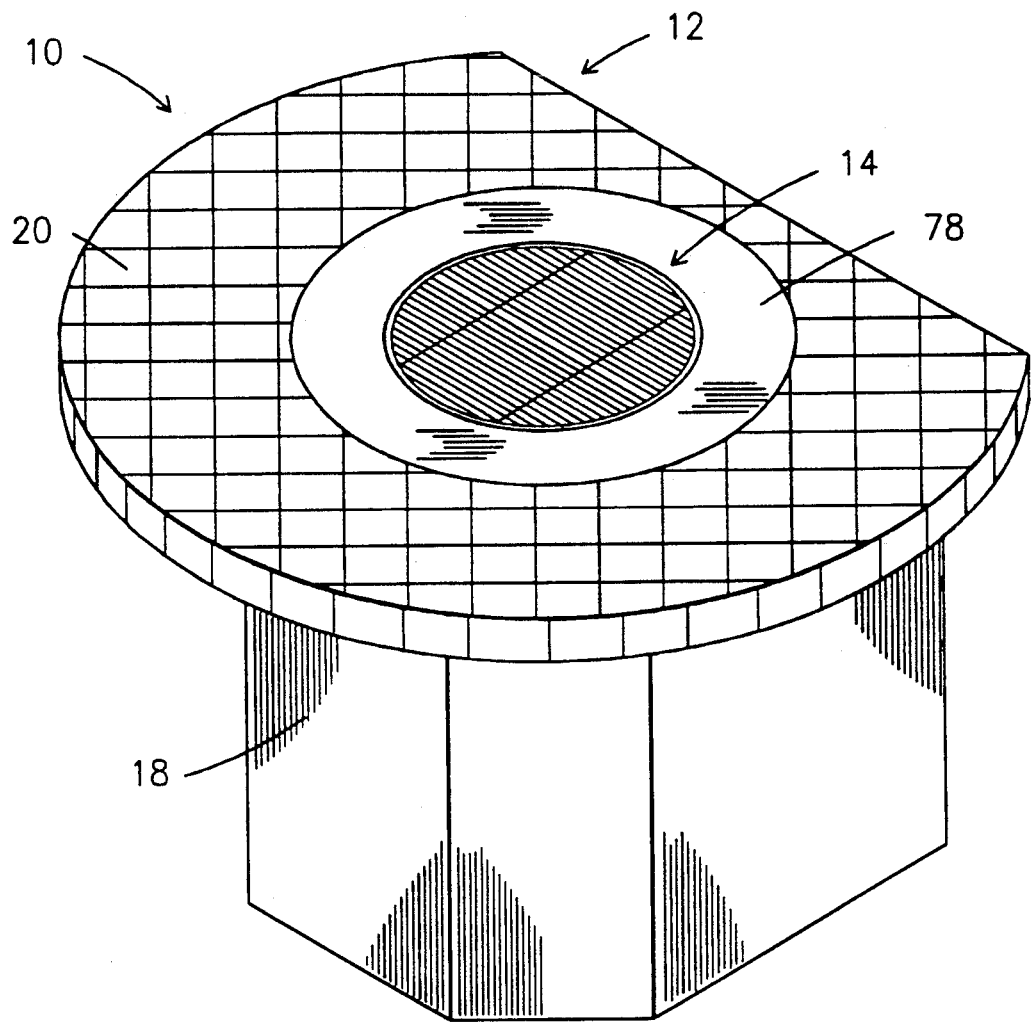
FIG. 1 is a perspective view of the combination table and cooking grill of the present invention.
Figure 2:
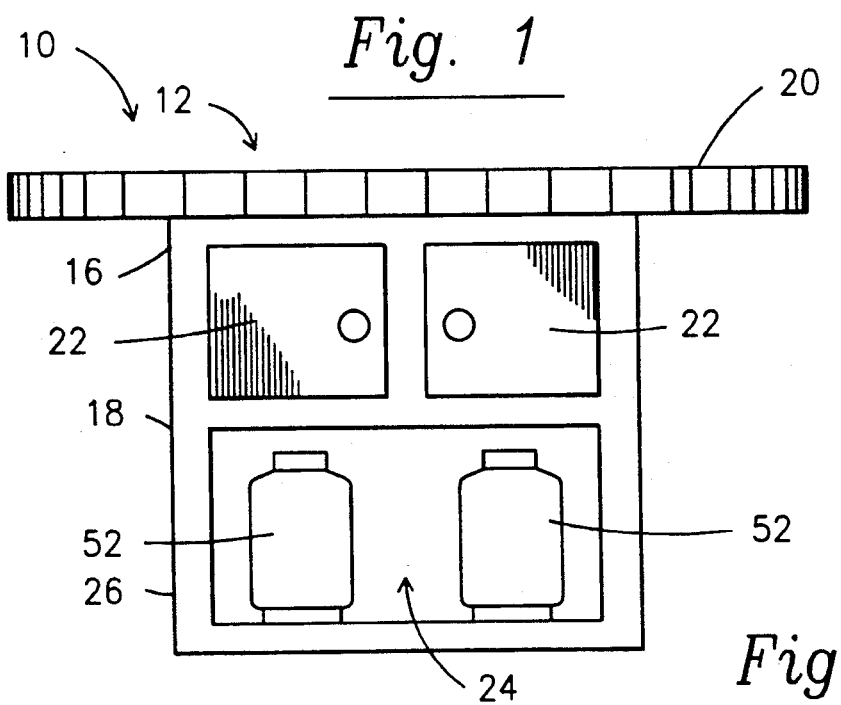
FIG. 2 is a rear view of the combination table cooking grill of the present invention.

As shown in FIGS. 1 and 2, the present invention relates to a combination table and cooking grill generally indicated as 10 including a substantially horizontal table top generally indicated as 12 having a centrally disposed aperture 14 formed therethrough mounted on the upper portion 16 of a substantially vertical hollow pedestal 18.

Figure 3:
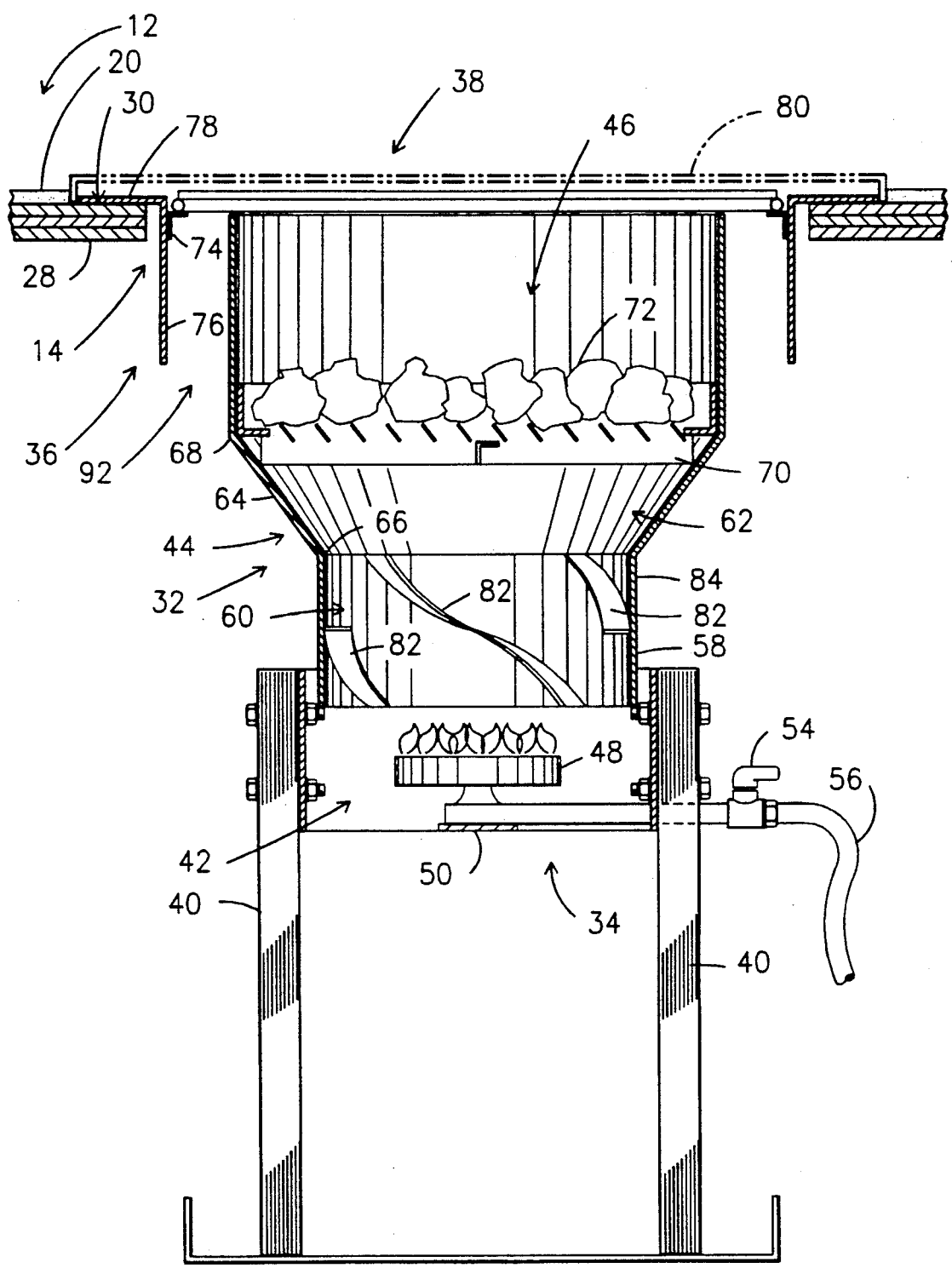
FIG. 3 is a cross-sectional view of the present invention.
Figure 4:
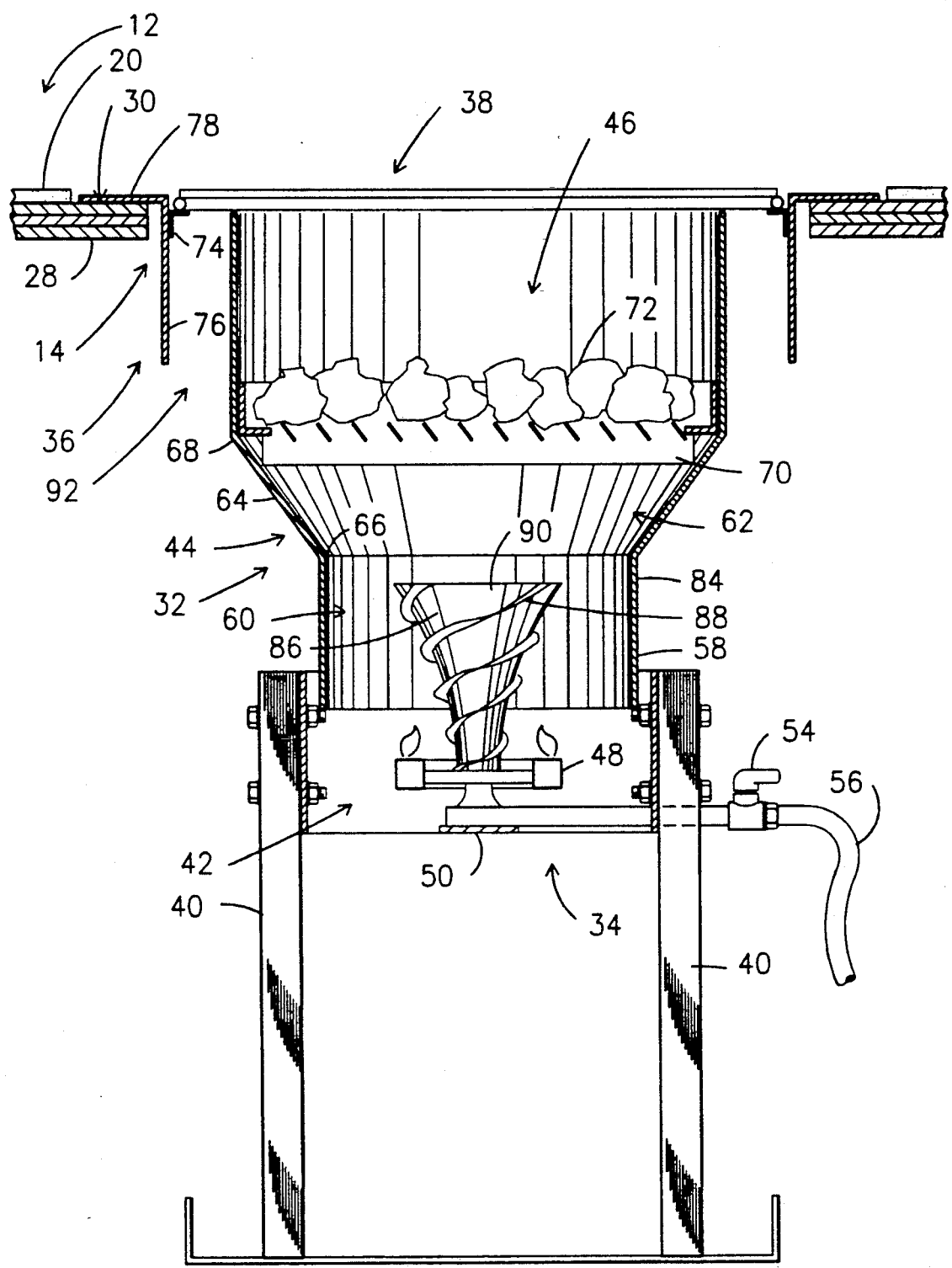
FIG. 4 is a partial cross-sectional review of an alternate embodiment of the present invention.

As best shown in FIG. 1, a table support surface 20 formed about the periphery of the centrally disposed aperture 14 provides a surface upon which to place food, drinks, condiments and the like. As shown in FIG. 2, a pair of access doors each indicated as 22 are hingedly attached to the substantially vertical hollow pedestal 18 to permit selective access to the interior of the upper portion 16 thereof; while, an access opening 24 formed in the of the substantially vertical hollow pedestal 18 permits access to the interior of the lower portion 26 thereof. As shown in FIGS. 3 and 4, the substantially horizontal table top 12 comprises the table support surface 20 mounted to a lower support member 28. An annular recess 30 is formed in the substantially horizontal table top 12 immediately adjacent the periphery of the centrally disposed aperture 14.

As best shown in FIGS. 3 and 4, the combination table and cooking grill 10 further includes an inner grill housing generally indicated as 32 to operatively house a heat source generally indicated as 34 therein, an outer insulation, draft sleeve generally indicated as 36 and a cooking grate generally indicated as 38 disposed in operative alignment with the heat source 34 and the centrally disposed aperture 14 such that persons around the periphery of the substantially horizontal table top 12 can cook on the cooking grate 38.

As best shown in FIGS. 3 and 4, the inner grill housing 32, supported by a plurality of housing support legs each indicated as 40, comprises a lower burner chamber 42, an intermediate expansion chamber generally indicated as 44 and an upper cooking chamber 46.

The lower burner chamber 42 is configured to operatively house a gas grill burner 48 or the like supported by a burner mounting brace 50 to provide the heat to cook or warm food placed on the cooking grate 38. As shown, the gas grill burner 48 is coupled to a gas source 52 (FIG. 2) through a control valve 54 by a gas line or conduit 56.

The intermediate expansion chamber 44 comprises a lower cylindrically shaped diffusor section 58 having diffusor means generally indicated as 60 disposed therein to diffuse air from the lower burner chamber 42 into an upper frustrum conical section 62 formed by an inclined side wall 64 such that the diameter of the upper frustrum conical section 62 increases from the lower end 66 to the upper end 68 thereof to evenly distribute the heated air from the lower burner chamber 42 to the upper cooking chamber 46.

The upper cooking chamber 46 is configured to operatively house a support tray 70 to support a heating bed 72 of charcoal, lava rock or the like to receive heat energy from the heat source 34 and to distribute heat to food placed on the cooking grate 38.

The cooking grate 38 is supported on a plurality of grate supports or elements each indicated as 74 affixed to a substantially vertical skirt 76 formed on an insulation ring 78 resting or disposed in the annular recess 30 to isolate and insulate the cooking grate 38 from the table support surface 20. The substantially vertical skirt 76 can form the outer insulation, draft sleeve 36. As shown in phantom in FIG. 3, the cooking grate 38 and insulation ring 76 may be replaced by an aperture cover or cap 80 to form a solid table top.

As shown in FIG. 3, the diffusor means 60 may comprise a plurality of arcuate vanes each indicated as 82 secured to the side wall 84 of the lower cylindrically shaped diffusor section 58 to impart a swirling movement to the heated air from the lower burner chamber 42.

As shown in FIG. 4, the diffusor means 60 may comprise a centrally disposed hollow inverted cone shaped member 86 having a continuous helical ridge 88 formed on the outer surface 90 thereof mounted on the burner mounting brace 50 to impart a swirling movement to the heated air from the lower burner chamber 42.

The outer insulation, draft sleeve 36 is disposed in surrounding spaced relationship relative to at least the upper portion of the inner grill housing 32 to cooperatively form an insulation, draft channel 92 therebetween.

In use, the heat source 34 is activated to the desired cooking temperature. Then the food to be cooked or heated is placed on the cooking grate 38. Once the food is cooked or heated as desired, the food may be conveniently placed on the table support surface 20.

During operation, ambient air is drawn down through the insulation, draft channel 92; while, the heated air above the heat source 34 rises through the intermediate expansion chamber 44 to be directed or diffused upwardly through the heating bed 72 to the cooking grate 38. Grease, if any, falling through the heating bed 72 will fall through the centrally disposed hollow inverted cone 86 onto a drip pan (not shown).

It will thus be seen that the objects set forth above, among those made apparent from the preceding description are efficiently attained and since certain changes may be made in the above construction without departing from the scope of the invention, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Now that the invention has been described,

What is claimed is:

1. A combination table and cooking grill comprising a table top having a centrally disposed aperture formed therethrough with a table support surface formed about the periphery thereof mounted on a hollow pedestal, an inner grill housing comprising a lower burner chamber, an intermediate expansion chamber and an upper cooking chamber to operatively house a heat source therein and a cooking grate disposed in operative alignment with said heat source and said centrally disposed aperture such that persons around the periphery of said table top can cook on said cooking grate as well as place food, drinks and condiments on said table support surface, said lower burner chamber configured to operatively house a gas grill burner to provide the heat to cook or warm food placed on said cooking grate, said intermediate expansion chamber comprising an upper frustrum conical section formed by an inclined side wall such that the diameter of said upper frustrum conical section increases from the lower end to the upper end thereof to evenly distribute the heated air from said lower burner chamber to said upper cooking chamber and a lower diffusor section having a diffusor means disposed therein to diffuse air from said lower burner chamber to said upper frustrum conical section.

2. The combination table and cooking grill of claim 1 wherein said diffusor means comprises a plurality of arcuate vanes secured to the side wall of said diffusor section to impart a swirling movement to the heated air from said lower burner chamber.

3. The combination table and cooking grill of claim 1 wherein said diffusor means comprises a centrally disposed inverted cone shaped member having a helical ridge formed on the outer surface thereof to impart a swirling movement to the heated air from said lower burner chamber.

4. The combination table and cooking grill of claim 3 wherein said centrally disposed inverted cone shaped member is hollow.

5. The combination table and cooking grill of claim 1 further including an outer insulation, draft sleeve disposed in surrounding spaced relationship relative to at least the upper portion of said inner grill housing to cooperatively form an insulation, draft channel therebetween.

6. The combination table and cooking grill of claim 1 wherein said upper cooking chamber is configured to operatively house a support tray to support a heating bed of charcoal or lava rock to receive heat energy from said heat source and to distribute heat to food placed on said cooking grate.

7. The combination table and cooking grill of claim 1 wherein said table top includes an annular recess formed therein adjacent the periphery of said centrally disposed aperture.

8. The combination table and cooking grill of claim 7 wherein said grate is supported on a plurality of grate supports affixed to a substantially vertical skirt formed on an insulation ring disposed in said annular recess to isolate and insulate said cooking grate from said table support surface.

9. The combination table and cooking grill of claim 3 further including an insulation ring disposed in said annular recess to isolate and insulate said cooking grate from said table support surface.

10. The combination table and cooking grill of claim 1 wherein said intermediate expansion chamber comprises a lower diffusor section having a diffusor means disposed therein to diffuse air from said lower burner chamber.

11. A combination table and cooking grill comprising a table top having a centrally disposed aperture formed therethrough with a table support surface formed about the periphery thereof mounted on a hollow pedestal, an annular recess formed adjacent the periphery of said centrally disposed aperture, an annular recess formed adjacent the periphery of said centrally disposed aperture, an inner grill housing to operatively house a heat source therein and a cooking grate supported on a plurality of grate supports affixed to a substantially vertical skirt formed on an insulation ring disposed in said annular recess to isolate and insulate said cooking grate from said table support surface disposed in operative alignment with said heat source and said centrally disposed aperture such that persons around the periphery of said table top can cook on said cooking grate as well as place food, drinks and condiments on said table support surface.

12. The combination table and cooking grill of claim 11 wherein said inner grill housing comprises a lower burner chamber, an intermediate expansion chamber and an upper cooking chamber.

13. The combination table and cooking grill of claim 12 wherein said lower burner chamber is configured to operatively house a gas grill burner to provide the heat to cook or warm food placed on said cooking grate.

14. The combination table and cooking grill of claim 13 wherein said intermediate expansion chamber comprises an upper frustrum conical section formed by an inclined side wall such that the diameter of said upper frustrum conical section increases from the lower end to the upper end thereof to evenly distribute the heated air from said lower burner chamber to said upper cooking chamber.

15. The combination table and cooking grill of claim 14 wherein said intermediate expansion chamber further includes a lower diffusor section having a diffusor means disposed therein to diffuse air from said lower burner chamber to said upper frustrum conical section.

16. The combination table and cooking grill of claim 15 wherein said diffusor means comprises a plurality of arcuate vanes secured to the side wall of said diffusor section to impart a swirling movement to the heated air from said lower burner chamber.

17. The combination table and cooking grill of claim 15 wherein said diffusor means comprises a centrally disposed inverted cone shaped member having a helical ridge formed on the outer surface thereof to impart a swirling movement to the heated air from said lower burner chamber.

18. The combination table and cooking grill of claim 17 wherein said centrally disposed inverted cone shaped member is hollow.

19. The combination table and cooking grill of claim 12 further including an outer insulation, draft sleeve disposed in surrounding spaced relationship relative to at least the upper portion of said inner grill housing to cooperatively form an insulation, draft channel therebetween.

20. The combination table and cooking grill of claim 12 wherein said upper cooking chamber is configured to operatively house a support tray to support a heating bed of charcoal or lava rock to receive heat energy from said heat source and to distribute heat to food placed on said cooking grate.

21. The combination table and cooking grill of claim 11 further including an insulating ring disposed in said annular recess to isolate and insulate said cooking grate from said table support surface.

22. The combination table and cooking grill of claim 13 wherein said intermediate expansion chamber comprises a lower diffusor section having a diffusor means disposed therein to diffuse air from said lower burner chamber.

23. A combination table and cooking grill comprising a table top having a centrally disposed aperture formed therethrough with a table support surface formed about the periphery thereof mounted on a hollow pedestal, an annular recess formed adjacent the periphery of said centrally disposed aperture, an insulation ring disposed in said annular recess to isolate and insulate said cooking grate from said table support surface, an inner grill hosing to operatively house a heat source therein and a cooking grate disposed in operative alignment with said heat source and said centrally disposed aperture such that persons around the periphery of said table top can cook on said cooking grate as well as place food, drinks and condiments on said table support surface.

24. A combination table and cooking grill comprising a table top having a centrally disposed aperture formed therethrough with a table support surface formed about the periphery thereof mounted on a hollow pedestal, an inner grill housing comprising a lower burner chamber, an intermediate expansion chamber and an upper cooking chamber to operatively house a heat source therein and a cooking grate disposed in operative alignment with said heat source and said centrally disposed aperture such that persons around the periphery of said table top can cook on said cooking grate as well as place food, drinks and condiments on said table support surface, said lower burner chamber configured to operatively house a gas grill burner to provide the heat to cook or warm food placed on said cooking grate, said intermediate expansion chamber comprises a lower diffusor section having a diffusor means disposed therein to diffuse air from said lower burner chamber.

25. A combination table and cooking grill comprising a table top having a centrally disposed aperture formed therethrough with a table support surface formed about the periphery thereof mounted on a hollow pedestal, an inner grill housing to operatively house a heat source therein and a cooking grate disposed in operative alignment with said heat source and said centrally disposed aperture and an outer insulation, draft sleeve disposed in surrounding spaced relationship relative and adjacent to at least the upper portion of said inner grill housing to cooperatively form an insulation, draft channel therebetween to create air flow over the outer surface of said inner grill housing to cool said outer surface, said inner grill housing comprises a lower burner chamber configured to operatively house a gas grill burner to provide the heat to cook or warm food placed on said cooking grate, an intermediate expansion chamber including an upper frustrum conical section formed by an inclined side wall such that the diameter of said upper frustrum conical section increases from the lower end to the upper end thereof to evenly distribute the heated air from said lower burner chamber to an upper cooking chamber.

26. The combination table and cooking grill of claim 25 wherein said intermediate expansion chamber further includes a lower diffusor section having a diffusor means disposed therein to diffuse air from said lower burner chamber to said upper frustrum conical section.

27. The combination table and cooking grill of claim 26 wherein said diffusor means comprise a plurality of arcuate vanes secured to the side wall of said diffusor section to impart a swirling movement to the heated air from said lower burner chamber.

28. The combination table and cooking grill of claim 26 wherein said diffusor means comprises a centrally disposed inverted cone shaped member having a helical ridge formed on the outer surface thereof to impart a swirling movement to the heated air from said lower burner chamber.

29. The combination table and cooking grill of claim 28 wherein said centrally disposed inverted cone shaped member is hollow.

30. The combination table and cooking grill of claim 25 wherein said upper cooking chamber is configured to operatively house a support tray to support a heating bed of charcoal, or lava rock to receive heat energy from said heat source and to distribute heat to food placed on said cooking grate.

31. The combination table and cooking grill of claim 25 wherein said table top includes an annular recess formed therein adjacent the periphery of said centrally disposed aperture.

32. The combination table and cooking grill of claim 31 wherein said grate is supported on a plurality of grate supports affixed to a substantially vertical skirt formed on an insulation ring disposed in said annular recess to isolate and insulate said cooking grate from said table support surface.

33. The combination table and cooking grill of claim 31 further including an insulation ring disposed in said annular recess to isolate and insulate said cooking grate from said table support surface.

34. The combination table and cooking grill of claim 25 wherein said intermediate expansion chamber comprises a lower diffusor section having a diffusor means disposed therein to diffuse air from said lower burner chamber.

35. A combination table and cooking grill comprising a table top having a centrally disposed aperture formed therethrough with a table support surface formed about the periphery thereof mounted on a hollow pedestal, an inner grill housing to operatively house a heat source therein and a cooking grate disposed in operative alignment with said heat source and said centrally disposed aperture and an outer insulation, draft sleeve disposed in surrounding spaced relationship relative and adjacent to at least the upper portion of said inner grill housing to cooperatively form an insulation, draft channel therebetween to create air flow over the outer surface of said inner grill housing to cool said outer surface, said inner grill housing comprises a lower burner chamber, an intermediate expansion chamber and an upper cooking chamber, said table top includes an annular recess formed therein adjacent the periphery of said centrally disposed aperture, said cooking grate is supported on a plurality of grate supports affixed to a substantially vertical skirt formed on an insulation ring disposed in said annular recess to isolate and insulate said cooking grate from said table support surface.

36. The combination table and cooking grill of claim 35 wherein said lower burner chamber is configured to operatively house a gas grill burner to provide the heat to cook or warm food placed on said cooking grate.

37. The combination table and cooking grill of claim 36 wherein said intermediate expansion chamber comprises an upper frustrum conical section formed by an inclined side wall such that the diameter of said upper frustrum conical section increases from the lower end to the upper end thereof to evenly distribute the heated air from said lower burner chamber to said upper cooking chamber.

38. The combination table and cooking grill of claim 37 wherein said intermediate expansion chamber further includes a lower diffusor section having a diffusor means disposed therein to diffuse air from said lower burner chamber to said upper frustrum conical section.

39. The combination table and cooking grill of claim 38 wherein said diffusor means comprises a plurality of arcuate vanes secured to the side wall of said diffusor section to impart a swirling movement to the heated air from said lower burner chamber.

40. The combination table and cooking grill of claim 38 wherein said diffusor means comprises a centrally disposed inverted cone shaped member having a helical ridge formed on the outer surface thereof to impart a swirling movement to the heated air from said lower burner chamber.

41. The combination table and cooking grill of claim 40 wherein said centrally disposed inverted cone shaped member is hollow.

42. The combination table and cooking grill of claim 33 wherein said upper cooking chamber is configured to operatively house a support tray to support a heating bed of charcoal or lava rock to receive heat energy from said heat source and to distribute heat to food placed on said cooking grate.

43. The combination table and cooking grill of claim 35 further including an insulation ring disposed in said annular recess to isolate and insulate said cooking grate from said table support surface.

44. The combination table and cooking grill of claim 36 wherein said intermediate expansion chamber comprises a lower diffusor section having a diffusor means disposed therein to diffuse air from said lower burner chamber.

45. A combination table and cooking grill comprising a table top having a centrally disposed aperture formed therethrough with a table support surface formed about the periphery thereof mounted on a hollow pedestal, an inner grill housing to operatively house a heat source therein and a cooking grate disposed in operative alignment with said heat source and said centrally disposed aperture and an outer insulating, draft sleeve disposed in surrounding spaced relationship relative and adjacent to at least the upper portion of said inner grill housing to cooperatively form an insulation, draft channel therebetween to create air flow over the outer surface of said inner grill housing to cool said outer surface, said inner grill housing comprises a lower burner chamber, an intermediate expansion chamber and an upper cooking chamber, said table top includes an annular recess formed therein adjacent the periphery of said centrally disposed aperture, further including an insulation ring disposed in said annular eases to isolate and insulate said cooking grate from said table support surface.

46. The combination table and cooking grill of claim 45 wherein said lower burner chamber is configured to operatively house a gas grill burner to provide the heat to cook or warm food placed on said cooking grate.

47. The combination table and cooking grill of claim 46 wherein said intermediate expansion chamber comprises an upper frustrum conical section formed by an inclined side wall such that the diameter of said upper frustrum conical section increases from the lower end to the upper end thereof to evenly distribute the heated air from said lower burner chamber to said upper cooking chamber.

48. The combination table and cooking grill of claim 47 wherein said intermediate expansion chamber further includes a lower diffusor section having a diffusor means disposed therein to diffuse air from said lower burner chamber to said upper frustrum conical section.

49. The combination table and cooking grill of claim 48 wherein said diffusor means comprises a plurality of arcuate vanes secured to the side wall of said diffusor section to impart a swirling movement to the heated air from said lower burner chamber.

50. The combination table and cooking grill of claim 48 wherein said diffusor means comprises a centrally disposed inverted cone shaped member having a helical ridge formed on the outer surface thereof to impart a swirling movement to the heated air from said lower burner chamber.

51. The combination table and cooking grill of claim 50 wherein said centrally disposed inverted cone shaped member is hollow.

52. The combination table and cooking grill of claim 45 wherein said upper cooking chamber is configured to operatively house a support tray to support a heating bed of charcoal or lava rock to receive heat energy from said heat source and to distribute heat to food placed on said cooking grate.

53. The combination table and cooking grill of claim 45 wherein said cooking grate is supported on a plurality of grate supports affixed to a substantially vertical skirt formed on an insulation ring disposed in said annular recess to isolate and insulate said cooking grate from said table support surface.

54. The combination table and cooking grill of claim 46 wherein said intermediate expansion chamber comprises a lower diffusor section having a diffusor means disposed therein to diffuse air from said lower burner chamber.

* * * * *